(12) United States Patent
David

(10) Patent No.: US 6,298,976 B1
(45) Date of Patent: Oct. 9, 2001

(54) DEVICE FOR ASSEMBLING ARTICLE GROUPS FROM ROD-SHAPED ARTICLES IN THE TOBACCO-PROCESSING INDUSTRY

(75) Inventor: Harry David, Hamburg (DE)

(73) Assignee: Topack Verpackungstechnik GmbH (DE)

( * ) Notice: Subject to any disclaimer, the term of this patent is extended or adjusted under 35 U.S.C. 154(b) by 0 days.

(21) Appl. No.: 09/490,639

(22) Filed: Jan. 24, 2000

(30) Foreign Application Priority Data

Jan. 23, 1999 (DE) ............................................. 199 02 597

(51) Int. Cl.[7] .................................................. B65G 47/30
(52) U.S. Cl. ..................................... 198/418.3; 198/418.1
(58) Field of Search ........................... 198/418.1, 418.2, 198/418.3, 418.4, 419.3, 429

(56) References Cited

U.S. PATENT DOCUMENTS

| | | | |
|---|---|---|---|
| 4,167,091 | * 9/1979 | Ruppert et al. ............... | 198/418.1 X |
| 4,306,648 | * 12/1981 | Manservisi et al. ............... | 198/418.3 |
| 4,471,866 | * 9/1984 | Erdmann et al. .................. | 198/418.3 |
| 4,700,825 | 10/1987 | Mattei et al. ....................... | 198/418.3 |
| 5,375,392 | * 12/1994 | Oberdorf ........................ | 198/418.1 X |
| 5,522,493 | * 6/1996 | Spada et al. ................... | 198/418.3 X |
| 5,548,941 | * 8/1996 | Portaro et al. ................. | 198/418.1 X |

* cited by examiner

Primary Examiner—James R. Bidwell
(74) Attorney, Agent, or Firm—Venable; George H. Spencer; Robert Kinberg

(57) ABSTRACT

A device is provided for assembling article groups from layers of rod-shaped articles used in the tobacco-processing industry. The rod-shaped articles are stacked one above the other and side-by-side in group forming bins that are intermittently movable in a forward direction. A number of funnels are provided that correspond, respectively, to the number of the article layers. Each funnel is divided into chutes. The chutes of each funnel receive the rod-shaped articles at chute inlets and are arranged for dropping the rod-shaped articles to chute outlets to form a layer of parallel aligned rod-shaped articles. A platform is disposed at each chute outlet for receiving the respective layer of parallel aligned rod-shaped articles. The platforms are staggered at successively different heights to define respective layer planes. Transfer push-rods are associated with a respective one of the funnels and are movable in the axial direction of the rod-shaped articles for pushing a respective one of the layers into a group forming bin. Each transfer rod is disposed at a level corresponding to a height of the respective layer plane and has an elongated slot. A phantom article is arranged at one of the chute outlets of each funnel that corresponds to a placement of the elongated slot in a respective one of the transfer push rods. Each phantom article is displaceable crosswise to the axial direction of the rod-shaped articles in the respective layer.

7 Claims, 4 Drawing Sheets

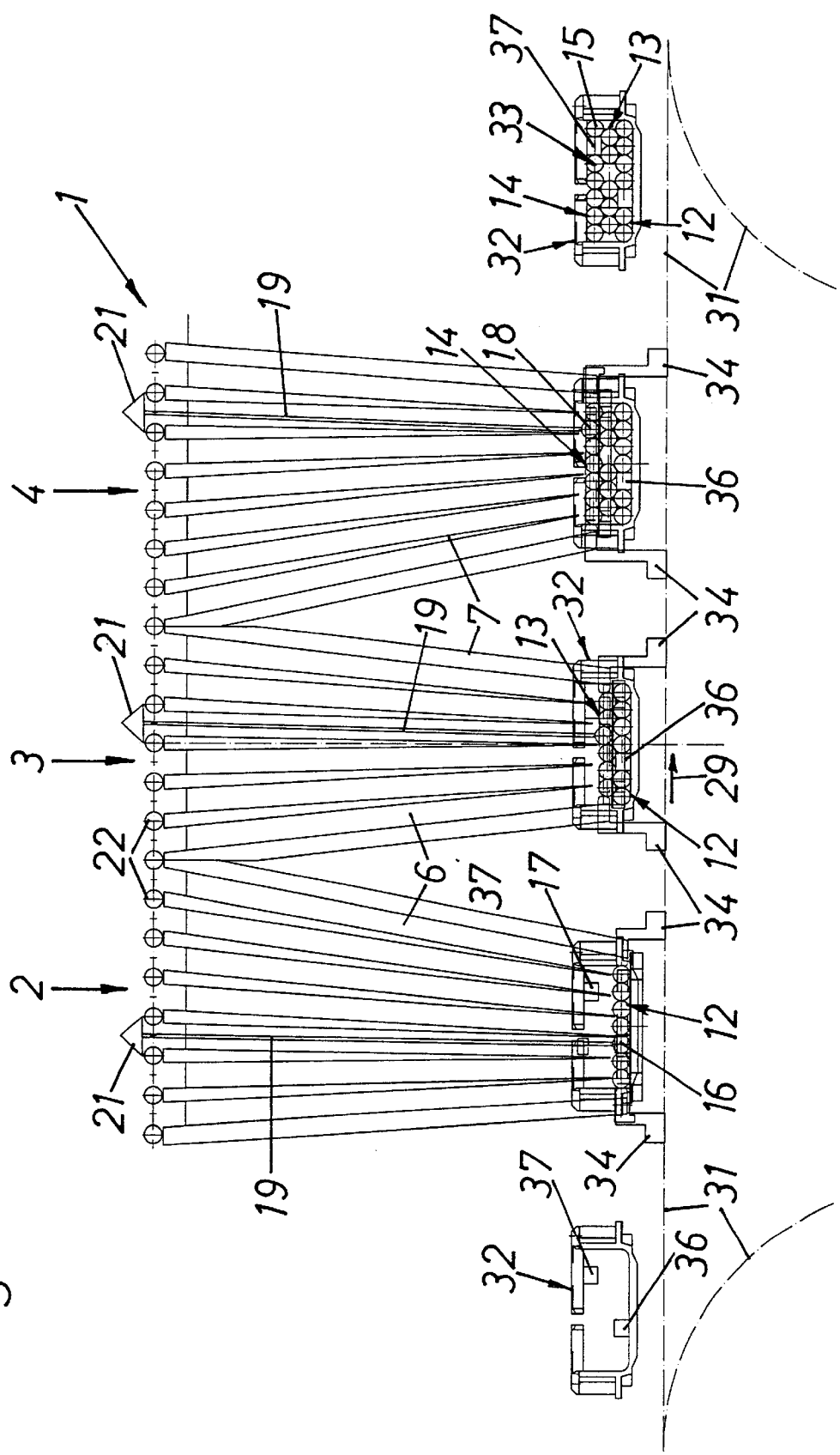

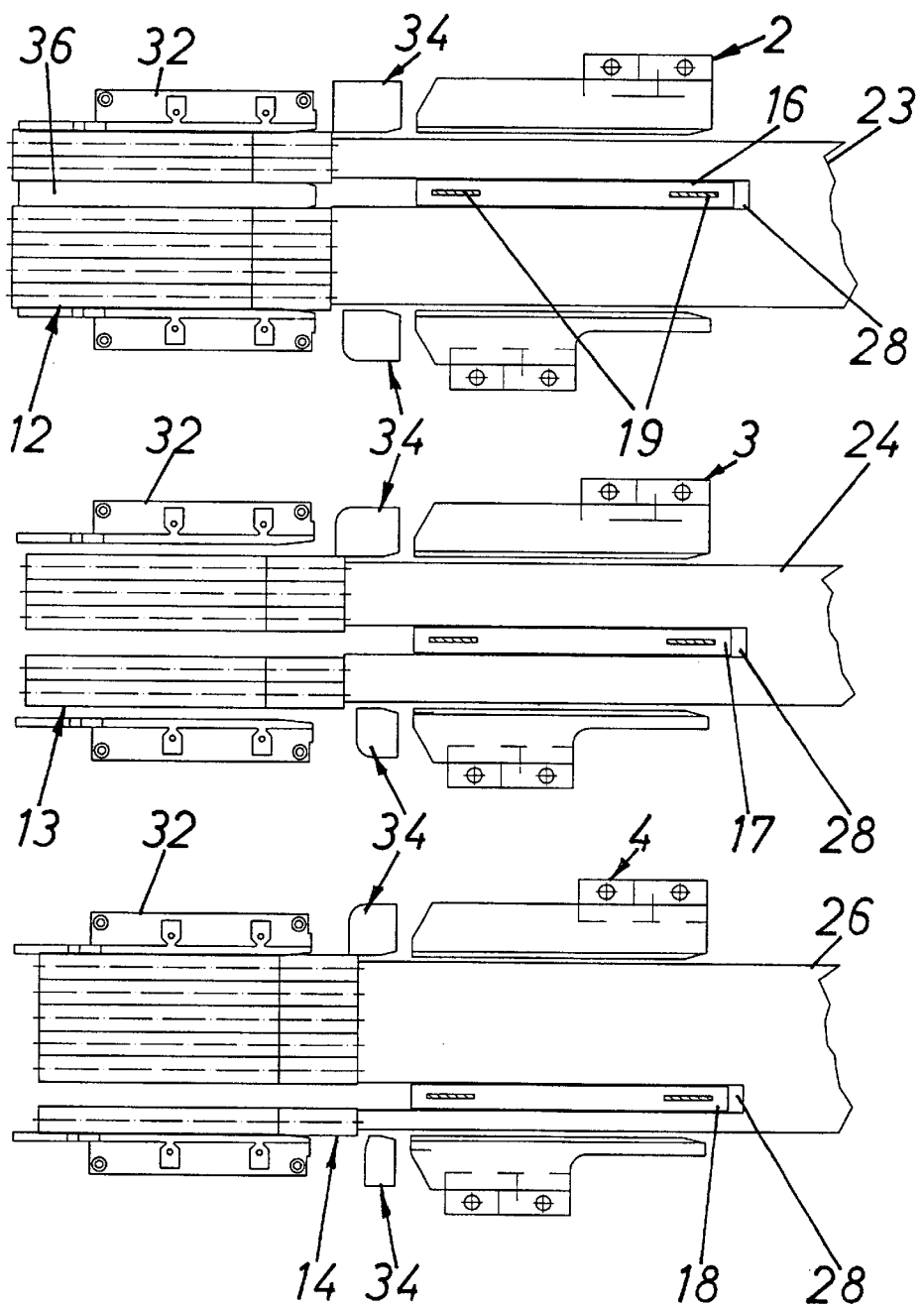

Figure 1:
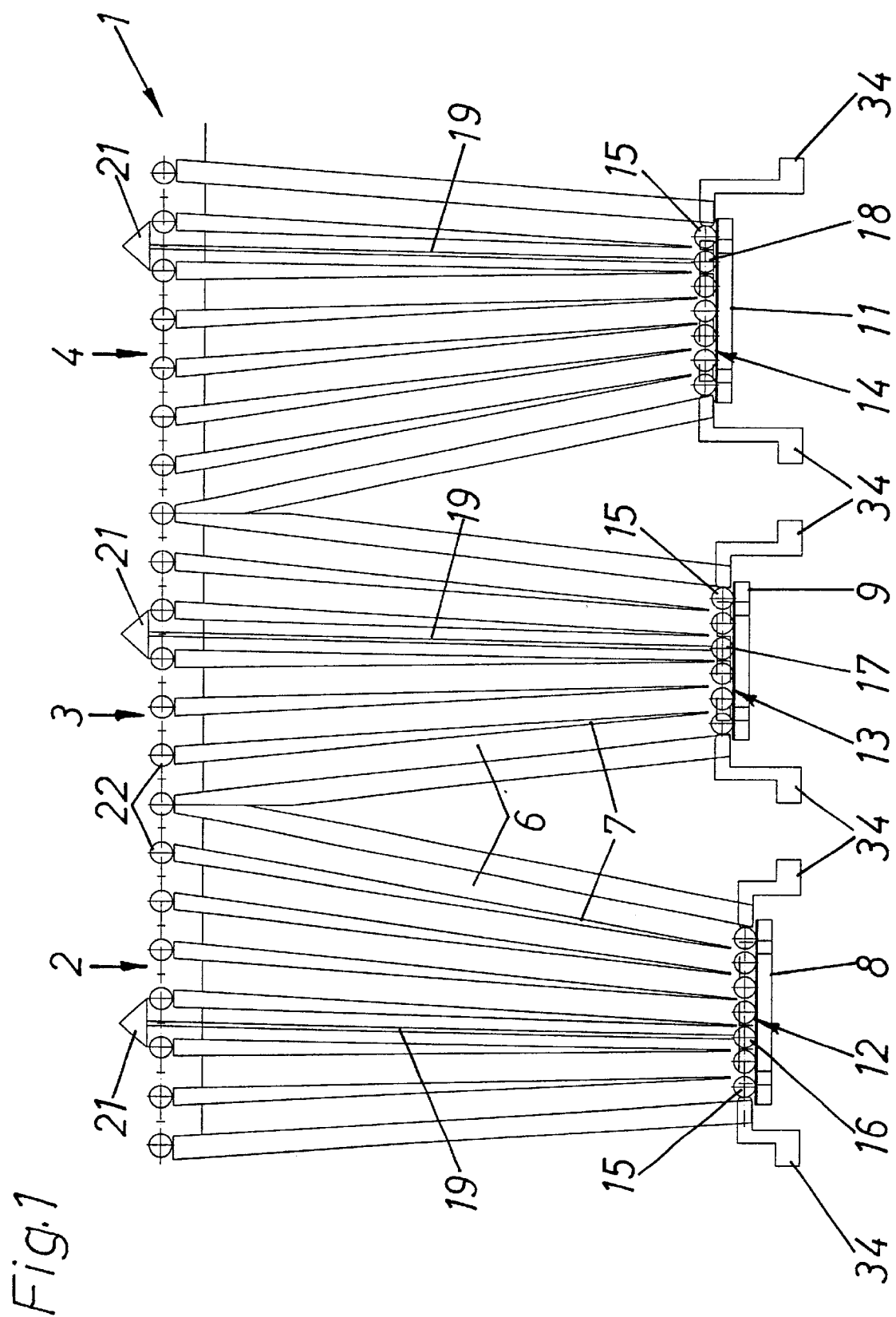

DEVICE FOR ASSEMBLING ARTICLE GROUPS FROM ROD-SHAPED ARTICLES IN THE TOBACCO-PROCESSING INDUSTRY

CROSS-REFERENCE TO RELATED APPLICATIONS

Priority is claimed with respect to application No. 199 02 597.5 filed in Germany on Jan. 23, 1999, the disclosure of which is incorporated herein by reference.

BACKGROUND OF THE INVENTION

The invention relates to a device for assembling article groups from layers of rod-shaped articles used in the tobacco-processing industry, which are stacked one above the other and side-by-side. The device comprises group-forming bins that move forward intermittently, as well as funnels that correspond to the number of article layers and are divided into chutes. Assigned to these funnels are transfer push rods which can be moved along the article axis and correspond to the height of the respective layer, as well as phantom articles at the chute outlet, which correspond to elongated slots in the transfer push rods.

For reasons of pricing, package production and handling, devices of the aforementioned type are designed to create one or several gaps or defined empty spaces on the cigarette pack inside with identical format or identical dimensions, meaning to create packs with a purposely incomplete content, which can thus contain a varied number of cigarettes.

With respect to such an arrangement, U.S. Pat. No. 4,700,825, for example, discloses preventing or blocking the flow of articles to the intended empty spaces with the aid of phantom articles during the layer or block formation of the pack content, which is pushed into the intermittently moved transport bins.

SUMMARY OF THE INVENTION

It is an object of the invention to optimize in particular the block-forming process during the transfer of cigarette layers with gaps into the transport bins.

The above and other objects are accomplished in the context of the assembling device first described above, wherein in accordance with the invention the phantom articles are arranged so that they can be moved in a direction crosswise to the axial direction of the phantom article. In principle, the mobility in such crosswise direction can be achieved in different ways or through respective guides for the phantom articles. A simple, preferred embodiment, however, consists in suspending the phantom articles in the manner of a pendulum. It is particularly useful in this connection if the pendulum suspension extends in an upward direction of the chute, which can be used for another advantageous design in that the pendulum suspension has a closing member for closing off the chute inlet. In addition, it is particularly advantageous if the closing member has a roof-type design to allow surplus articles that drop to be diverted to the side, into neighboring drop chutes.

An advantage achieved with the invention is that the lateral compressing of the cigarettes, which is necessary for the longitudinal axial insertion of the cigarette layers into the transport bins and results in a compressing of the block formation, is made easier in a manner that protects the cigarettes in that the phantom cigarette serving as a mock-up article adapts to any lateral displacement of the cigarettes during the course of their longitudinal axial insertion.

BRIEF DESCRIPTION OF THE INVENTION

The invention is explained further in the following with the aid of an exemplary embodiment that is shown in the drawing.

Figure 2:
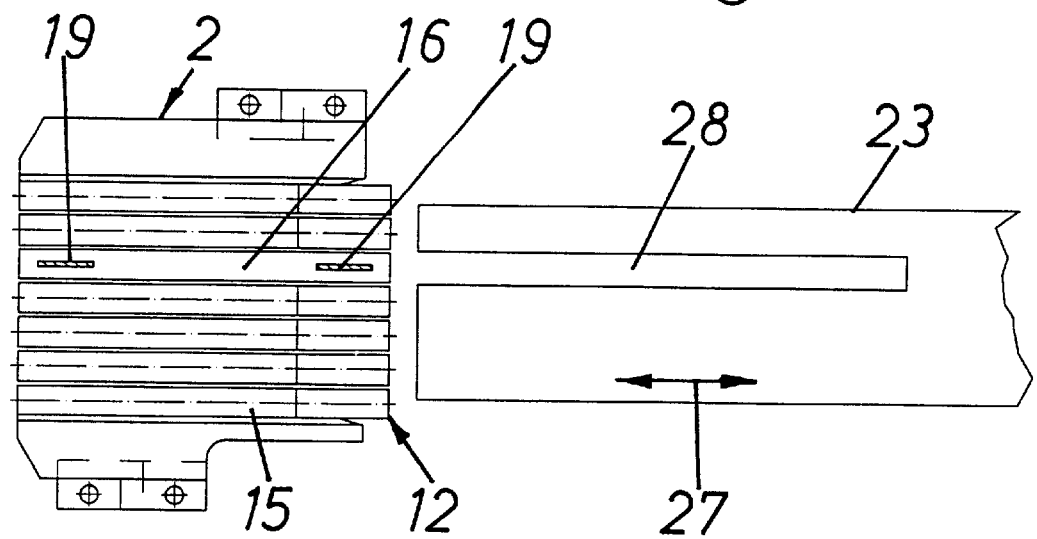
Figure 2:
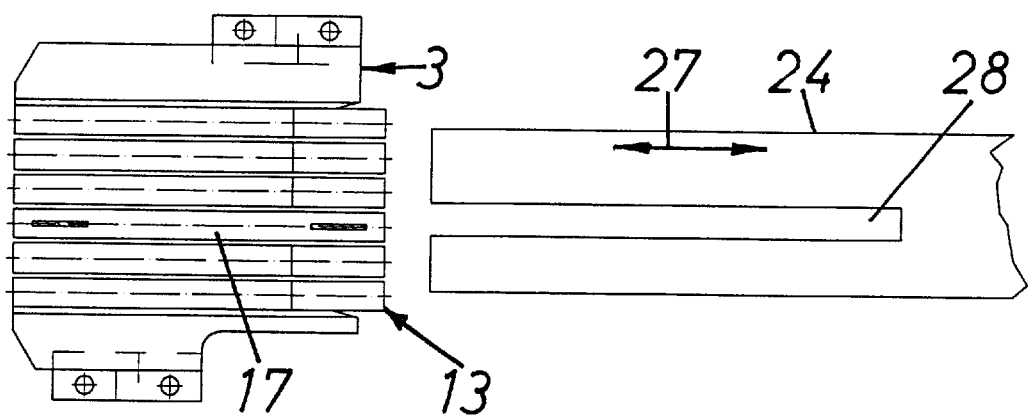
Figure 2:
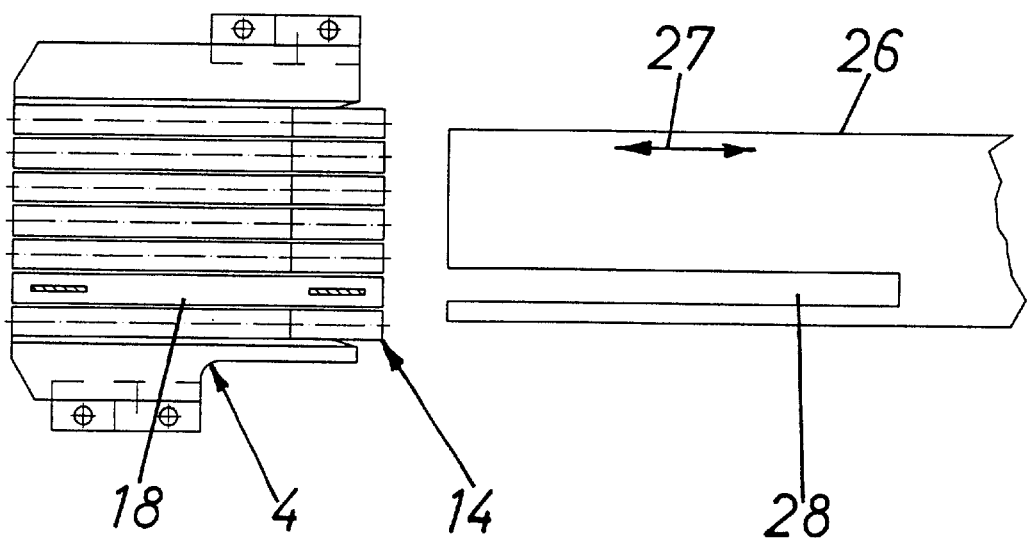

Shown are in:

FIG. 1 A cigarette feeding station on a packaging machine, in a schematic view from the side;

FIG. 2 A view from above of the feeding station;

FIG. 3 The feeding station with a coordinated bin conveyor for cigarette groups and FIG. 4 The device according to FIG. 3 in a view from above.

DETAILED DESCRIPTION OF THE INVENTION

Referring to FIG. 1, there is shown a feeding station 1, for receives cigarettes from a storage container (not shown), which is divided on the bottom into three side-by-side arranged feeding funnels 2, 3 and 4, which are respectively divided into several drop chutes 6. Drop chutes 6 have limiting walls 7 that end respectively above platforms 8, 9 and 11. Platforms 8, 9 and 11 are arranged on different, staggered planes, wherein the height difference between two successive platforms 8, 9 or 9, 11 is at least equal to a cigarette diameter.

Respectively incomplete layers 12, 13, 14 of side-by-side arranged cigarettes 15 are formed on platforms 8, 9 and 11. Laterally displaceable phantom cigarettes 16, 17 and 18 are arranged for this, respectively, at the outlet of one of the drop chutes 6 of each feeding funnel 2, 3 and 4. The lateral mobility, which can be realized in different ways, is achieved for the design shown herein through a pendulum suspension 19 of the phantom cigarettes 16 to 18, which respectively extends in a chute upward direction and comprises a roof-shaped closing member 21 that closes off the chute intake. The closing member 21 prevents a filling of the respective drop chute 6, which is blocked on the underside by the phantom cigarettes 16, 17, 18 and directs subsequently dropping cigarettes 15 to the inlet of neighboring drop chutes 6. Rotating rods 22 that limit the drop chutes 6 support a continuous filling of the chutes.

According to FIG. 2, transfer push rods 23, 24, 26 are assigned to the back sides of feeding funnels 2 to 4, respectively in the plane for the cigarette layers 12 to 14 that are formed on the staggered platforms 8, 9, 11. The push rods can be moved back and forth in a direction of double arrow 27 and are provided with a recess in the form of an elongated slot 28, extending in movement direction (arrow 27), which corresponds to the position of a phantom cigarette 16, 17, 18 of the respective feeding funnel 2 to 4.

As shown in FIGS. 3 and 4, a bin conveyor 31, indicated with dash-dot line, is arranged on the front of feeding funnels 2 to 4. This conveyor circulates in a direction of arrow 29 and is equipped at regular intervals with transport bins 32, used to form three-layer cigarette groups 33.

According to FIGS. 3 and 4, position-alignment means 34 are provided between the feeding funnels 2 to 4 and the transport bins 32, which are positioned in a transfer position during an idle phase of the bin conveyor 31. Alignments means 34 act from the side upon the cigarette layers 12 to 14, formed on the respective plane for platforms 8, 9, 11.

FIG. 3 shows successive transport bins 32 at various filling levels during transport in the direction of arrow 29 of bin conveyor 31, in the respective transfer positions at the level of platforms 8, 9, 11 of feeding funnels 2 to 4. At feeding funnel 2, a first layer 12 of cigarettes 15 is pushed into bin 32 with a pre-stroke of transfer push rod 23 while forming a gap or a defined empty space with the phantom cigarette 16. In the process, the phantom cigarette 16 automatically adjusts to any side displacement or compressing of layer 12 when passing by the position alignment means 34 or during the insertion into the transport bin 32 by performing a corresponding side displacement movement, or a pendulum movement, or by assuming a slanted axial position. Damaging lateral or shearing forces acting upon the cigarettes are prevented in this way and a displacement and maintaining of the generated gap or empty space is ensured.

Inside of transport bin 32, a spacing web 36 on the bottom of the bin secures the generated empty space in the first layer 12.

A second layer 13 is transferred in the same way from platform 9 of feeding funnel 3 to the correspondingly positioned transport bin 32, wherein the individual cigarettes 15 are respectively deposited in a depression between two cigarettes of the first layer 12. The empty space generated with the phantom cigarette 17 in the layer 13 in this case is maintained without auxiliary means in transport bin 32.

The empty space generated by the phantom cigarette 18 in the third layer 14, which is transferred in the same way from the platform 11, is again maintained with the aid of a spacing web 37 on the upper bin wall.

In the subsequent production process, the cigarette groups formed from three cigarette layers 12 to 14 with three defined empty spaces, are pushed into or wrapped with the packaging material while still maintaining this form.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A device for assembling article groups from layers of rod-shaped articles used in the tobacco-processing industry, wherein the rod-shaped articles are stacked one above the other and side-by-side in group forming bins that are intermittently movable in a forward direction, said device comprising:
    a number of funnels that correspond, respectively, to the number of the article layers, each funnel being divided into chutes, the chutes of each funnel receiving the rod-shaped articles at chute inlets and being arranged for dropping the rod-shaped articles at chute outlets to form a layer of parallel aligned rod-shaped articles;
    a number of platforms each disposed at the chute outlets of a respective one of the funnels for receiving the respective layer of parallel aligned rod-shaped articles, the platforms being staggered at successively different heights to define respective layer planes;
    transfer push-rods associated with a respective one of the funnels and movable in the axial direction of the rod-shaped articles for pushing a respective one of the layers into a group forming bin, each transfer rod being disposed at a level corresponding to a height of the respective layer plane and having an elongated slot; and
    a phantom article arranged at one of the chute outlets of each funnel that corresponds to a placement of the elongated slot in a respective one of the transfer push rods, each phantom article being displaceable crosswise to the axial direction of the rod-shaped articles in the respective layer.

2. A device according to claim 1, further comprising a number of pendulums from which a respective one of the phantom articles is suspended.

3. A device according to claim 2, wherein each pendulum includes a pendulum suspension extending upwardly in a respective one of the chutes.

4. A device according to claim 3, wherein each pendulum suspension comprises a closing member for closing off the chute inlet of the respective chute.

5. A device according to claim 4, wherein the closing member has a roof-shaped form.

6. A device according to claim 2, wherein each pendulum comprises a closing member for closing off the chute inlet of the respective chute in which a phantom article is suspended.

7. A device according to claim 6, wherein the closing member has a roof-shaped form.

\* \* \* \* \*